United States Patent [19]
Miller, III et al.

[11] Patent Number: 5,626,306
[45] Date of Patent: May 6, 1997

[54] MULTIPLE LEVEL LOAD LIMITER FOR PRIMARY AND SECONDARY COLLISIONS

[75] Inventors: Harold J. Miller, III, Troy; Niels Dybro, Utica, both of Mich.

[73] Assignee: AlliedSignal Inc., Morristown, N.J.

[21] Appl. No.: 514,287

[22] Filed: Aug. 11, 1995

[51] Int. Cl.$^6$ ................................ B60R 22/28
[52] U.S. Cl. ........................................ 242/379.1
[58] Field of Search ............... 242/379.1; 280/805, 280/806; 297/470, 471, 472, 476, 477, 478

[56] References Cited

U.S. PATENT DOCUMENTS

| | | | |
|---|---|---|---|
| 3,790,099 | 2/1974 | Beller | 297/470 |
| 3,881,667 | 5/1975 | Tandetzke | 242/379.1 |
| 3,927,846 | 12/1975 | Meissner | 242/379.1 |
| 3,952,967 | 4/1976 | Barile et al. | 242/379.1 |
| 5,511,739 | 4/1996 | Dybro et al. | 242/379.1 |

*Primary Examiner*—John M. Jillions
*Attorney, Agent, or Firm*—Markell Seitzman

[57] ABSTRACT

An energy absorbing seat belt retractor comprising: a frame (22); a spool (24) rotatably mounted relative to the spool including a lock wheel (71) having a plurality of lock teeth associated therewith and adapted to receive a seat belt thereabout; a lock pawl (77) for engaging the spool upon sensing a one of a vehicle deceleration and seat belt extraction above certain determinable levels; and movable nut (90) located in the spool and for prohibiting relative movement between the lock wheel and spool below a threshold input force level generated in part by occupant load on the seat belt and for generating a controlled energy dissipating reaction force on the seat belt after the input force exceeds the threshold level to permit a controlled rotation of the spool and the controlled pay-out of the seat belt from the spool during a first and subsequent accidents.

5 Claims, 4 Drawing Sheets

MULTIPLE LEVEL LOAD LIMITER FOR PRIMARY AND SECONDARY COLLISIONS

BACKGROUND AND SUMMARY OF THE INVENTION

The present invention relates to vehicle safety restraint products and generally to a seat belt retractor having means for absorbing (dissipating) a certain amount of energy during a crash by deforming and/or crushing internal parts and in so doing controlling occupant forward motion. The present invention finds particular application in primary as well as secondary vehicle accidents.

Safety belt restraint systems (or sub-systems) are designed to meet separate and distinct safety criteria and performance standards. The performance of these systems is measured in terms of known, occupant injury performance standards such as head injury criteria (HIC) and chest acceleration. It is believed that a limit of the performance of prior systems as manifested by increased occupant chest acceleration and related chest loading, is the result of an effective increased stiffness afforded by the seat belt system working independently or in concert with the air bag system. These injury criteria and the potential for actual injury can be reduced by introducing into the seat belt safety system an energy management device which absorbs, i.e. dissipates, a certain amount of the energy produced in a vehicular crash or other emergency driving condition and in so doing lessens the amount of energy imparted to the occupant lessening the injury and in so doing providing a means of controlling the displacement of the occupant.

It is an object of the present invention to provide an improved occupant protection system and more specifically an energy absorbing retractor that is fully operative prior to and during at least a first and a secondary vehicle impact. The invention describes an apparatus for improving occupant injury performance to reduce the potential for injuries. A further object of the present invention is to provide an energy absorbing or dissipating mechanism internal to the retractor.

The present invention comprises: an energy absorbing seat belt retractor comprising: a frame; a spool rotatably mounted relative to the frame including a lock wheel having a plurality of lock teeth associated therewith and adapted to receive a seat belt thereabout. The retractor additionally includes first means for engaging and stopping the rotation of the spool upon sensing a vehicle parameter such as if vehicle deceleration or the rate or rate increase of seat belt extraction is above certain determinable levels. Second means are located within the spool which join the lock wheel to the spool for prohibiting relative movement therebetween below a threshold input force level generated in part by occupant load on the seat belt and for generating a controlled energy dissipating reaction force on the seat belt after the input force exceeds the threshold level to permit a controlled rotation of the spool and the controlled protraction of the seat belt from the spool during at least a first and a second collision.

In the preferred embodiment of the invention the spool includes an axle assembly having fixed end portions and a movable nut interior thereto for dissipating or absorbing energy as it moves. In the context of the present invention energy dissipation and energy absorption are used interchangeably. Various embodiments are presented which illustrate mechanisms to provide energy absorption or load limiting during secondary vehicle impacts or collisions.

Many other objects and purposes of the invention will be clear from the following detailed description of the drawings.

DETAILED DESCRIPTION OF THE DRAWINGS

The following embodiments generally refer to methods and apparatus for changing the stiffness characteristics of a seat belt system so that occupant protection can also be ensured during a secondary vehicular collision. As can be appreciated during the first or primary accident the safety system consisting of an air bag and a retractor with (or without) a pretensioner is available to protect the occupant. The retractor, under the dynamic loading conditions generated during the crash, will generate a particular energy absorbing or constant load limiting characteristic to provide for improved occupant safety performance. Experience has shown that a secondary accident is fairly common and most often occurs within six seconds of the first impact, that is, based upon a normal statistical distribution. Since the air bag and pretensioner have also been used to assist in protecting the occupant during the primary accident they are no longer available to protect the occupant during subsequent impacts.

Figure 1:
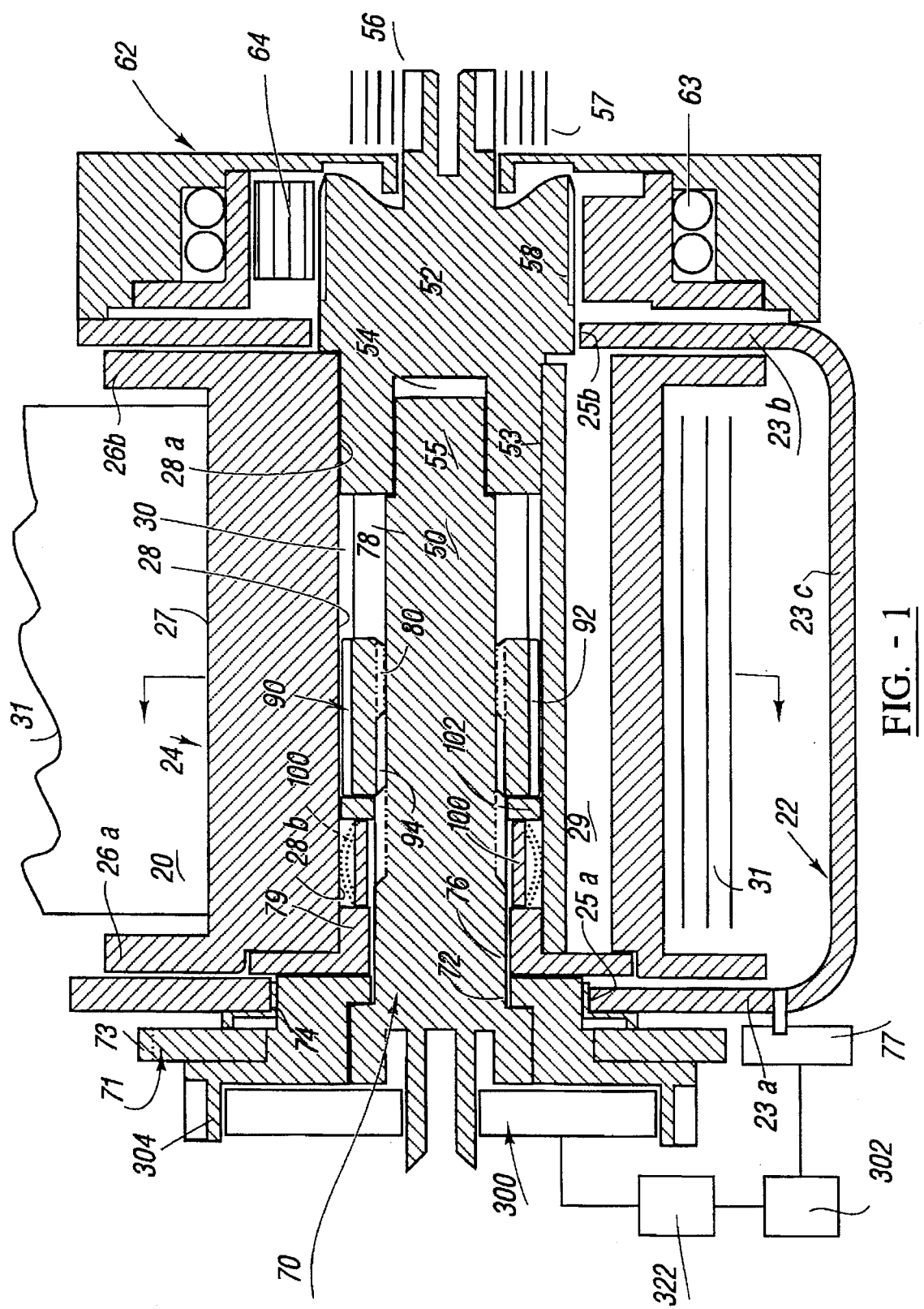
FIG. 1 illustrates a cross-sectional view showing many of the major components of the present invention and shows a retractor usable in primary and secondary impacts.
Figure 2:
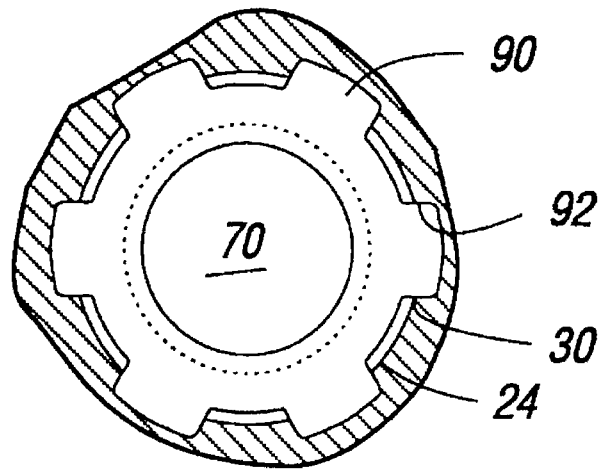
FIG. 2 illustrates a partial cross-sectional view of a spool along section line 2—2 of FIG. 1.

Reference is made to FIG. 1 which illustrates a retractor 20 having a U-shaped frame 22 adapted to be connected to a part of a vehicle body or to a part of an occupant seat. The frame includes frame sides 23a,b having respective openings 25a and 25b and a rear or connecting part 23c. The central openings may be of different diameter as shown or the same which will depend upon how the spool is supported on the frame sides. The retractor additionally includes a spool or reel 24 rotatably mounted to the frame 22. The spool includes two flanges 26a and 26b, a center part 27 about which seat belt webbing 31 is wound and a center bore 28 which includes a plurality of axially directed splines or slots 30. The center part 27 includes a slot 29 which provides a means for inserting one end of the seat belt 31 into the spool in a known manner.

Partially situated within the bore 28, is an axle assembly 50 which includes a first member 52 inserted in bore end 28a, and a second member 70 at bore end 28b. The first member 52 includes a walled portion 53 received in bore end 28a and a hexagonal bore 54 to provide a driving, rotational engagement with a similarly shaped end 55 of the second member 70. The first member 52 includes a forked end 56 that forms a spring arbor and is adapted to receive a rewind spring 57, of known construction to retract the extended seat belt. An intermediate part 58 of the first member 52 provides an interface with a cooperating clutch 62. The clutch 62 may be a part of a pyrotechnic pretensioner (or belt tightener)

mechanism which when activated propels a piston down a tube (not shown) to pull on a wire cable 63 causing clutch shoes or rollers 64 to engage member 52 to forcibly rewind and reduce unneeded slack in the belt (torso or lap) connected to the retractor 20. The operation of this type of pretensioner and clutch is known in the art and need not be discussed in any detail. As can be seen the clutch 62 supports the right hand end of the axle assembly 50 and provides a bearing surface upon which the intermediate portion 58 of the axle assembly 50 rotates.

The second member 70 includes a part 72 that is supported relative to the frame 22 by a bearing 74. The second member 70 additionally includes a second part 76. An annular member 79 interposes the member 70 and the spool 24 and serves as a mechanical stop and also rotationally supports the spool. The second member includes a narrow portion 78 that extends further into the center of the bore 28. This narrow portion 78 includes a plurality of threads 80. A carrier member such as a threaded nut 90 interposes the narrow member 78 and the spool 24. The inside surface of the nut includes threads 94 which matingly engage threads 80 of the narrow portion 78. This nut, on its outer surface, includes a plurality of splines 92 which permit the nut to move axially along the cooperating splines 30 of the spool 24 as it rotates on the threads 80. As can be appreciated the threads can be on the spool and the splines on the narrow portion 78. The second member 70 also includes an integrally formed or joined lock wheel 71 having lock teeth 73 thereon engaged by a locking pawl 77 rotatably mounted to the frame 22 in a known manner. Situated between the nut 90 and the stop member 79 is a deformable, energy absorbing bushing 100 and a thrust washer 102 slidably engaging bore 28 and the outer diameter of the second member 70.

Member 70 is locked in response to information derived from a vehicle sensor and a web sensor. These sensors respectively sense excessive vehicle deceleration and an excessive rate increase of seat belt protraction from the retractor 20. One such vehicle sensor 302 and web sensor 300 are diagrammatically shown in FIG. 1. These sensors can be integrated into a single sensing mechanism or used as separate devices. European Patent Document EP 0 228 729 A1 is illustrative of a retractor having these types of sensors used to activate the lock pawl relative to a lock wheel. Such a sensor would include the web sensor 300 typically received within a ratchet wheel 304, a rotatably mounted lock cup 322 and a rotatably mounted locking pawl 302 mounted to the frame but moved by the lock cup. This type of sensor mechanism also includes a vehicle sensor comprising a sensor pawl which locks with the ratchet wheel teeth and an inertia mass such as a standing man. Upon movement of the inertia mass, the sensor pawl is moved into engagement with ratchet teeth formed on the ratchet wheel 304. When either of the vehicle or web sensors is activated it causes the locking pawl 77 to move into a mating engagement with the teeth 73 of the lock wheel 71.

During an accident the locking pawl 77 engages the teeth 73 of the lock wheel 71 thereby preventing the lock wheel, member 70 and spool 24 from rotating. Thereafter because of the dynamics created in a crash the occupant moves or tends to move forward (depending upon the amount of slack in the seat belt at that time) generating a substantial force upon the belt (the lap and/or shoulder belt) that is connected to the spool. This force is transmitted via the seat belt webbing wound about the center part 27 of the spool 24 creating a torque tending to rotate the spool, in a belt unwinding direction. The tendency of the spool to rotate is halted by the reaction forces generated at the interfaces between the nut 90 and the spool 24, the nut and the second member and the lock wheel 71 and the lock pawl 77. The loads (or torques) imparted to the spool are transmitted directly to the threads 80 of the now locked second member 70 which tends to cause the nut 90 to try to rotate to the left about the threads 80 as viewed in FIG. 1 and simultaneously slide along the splines 30. This motion is initially halted by the bushing 100 which is loaded between the stop member 79 and washer 102. At some level of belt force the torsional forces developed at the thread 80/94 interface will be sufficient to cause the bushing 100 to begin to deform. Once this force level is reached the nut 90 will continue to rotate and slide along compressing or deforming the bushing. As can be appreciated as the spool rotates, seat belt webbing is permitted to protract under the pulling force exerted by the occupant on the seat belt. The pulling force is limited by the reaction force capability of the shaft assembly 50, that is the characteristics of the bushing 100. If the amount of slack introduced into the seat belt is not controlled the occupant may be subjected to increased HIC and chest loading. The control of the occupant's motion is obtained by generating a substantially constant reaction force against the belt. This reaction force is generated as the bushing is deformed as it is compressed by the nut 90.

Figure 3:
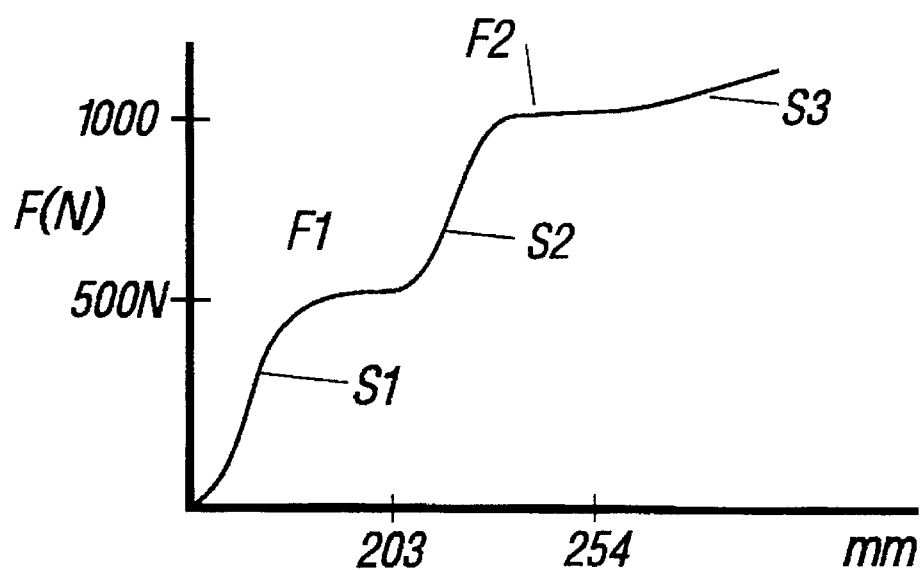
FIG. 3 illustrates a force versus belt extension curve showing the belt force exerted on the occupant.

During a first accident the rotation of the lock wheel is halted and the spool 27 is rotated as the occupant loads the seat belt. This rotation of the spool 27 causes the nut 90 to advance against the ring or bushing 100. As the bushing 100 is compressed (see S1 of FIG. 3) the reactive force is defined generally by the yield strength of the bushing. Further rotation of the spool and movement of the nut compresses the bushing to its yield strength limit and generates through the nut the constant reaction force or torque on the spool which in turn generates a constant reaction force F1 (see FIG. 3) on the belt. The dimensions of the outer bore 28 and the length and material of the bushing 100 are chosen to achieve a generally constant reaction force during the primary accident which is approximately in the range of 400–2000 lbs. (1780–8900 Newtons). As an example it has been found that during a typical accident the occupant might cause the amount of about 20 cm (8 inches) of webbing to be protracted from the retractor. This amount of protraction can be equated to movement of the nut and deformation of the bushing. As such the bushing length and the thread pitch of threads 80 and 94 can be chosen to permit the nut 90 to be able to move the anticipated distance to the left. Depending upon the crash characteristics the desired reactive load generated in the retractor can be in the range of 400 lbs. to 2000 lbs. (1780–8900 Newtons). Typically this can be achieved by choosing a different material for the bushing 100. The horizontal axis of FIG. 3 is shown in millimeters of cumulative seat belt extension measured after a pretensioner, if used, has rewound the seat belt about the spool for a first crash. After the bushing or ring 100 has been compressed and the first impact has subsided the retractor 20 shown above is fully functional and will rewind the protracted webbing onto the spool as soon as the occupant forces have subsided. It has been found that during secondary impacts, if the seat belt restraining force is limited at a higher generally constant level than F1, the occupant's forward motion will be sufficiently limited to adequately protect the occupant. One reason that this higher force level is desired is that after the first impact the retractor is the only element of the system that remains functional. During a first impact the occupant is protected by the retractor generated forces, the pretensioner and an air bag. However, after the first impact the pretensioner and air bag are expended.

Subsequently, if the vehicle is involved in a secondary impact, the occupant will once again load the seat belt, the various sensors of the retractor again lock the lock wheel. Thereafter, the nut 90 again rotates as described above further compressing the bushing 100 to the condition shown in phantom line. As the bushing compresses it will also become seated against the inner wall 28 of the spool at which time the force needed to compress the bushing increases. Subsequent movement of the nut causes the bushing or ring 100 to bottom out against the inner diameter 28 of the spool 27. Because of this restricted or blocked expansion of the bushing 100 offered by the spool's inner wall or diameter, any further rotation of the nut 90 must react against the increased forces needed to further deform the now constricted bushing 100, the effect of which is to increase the constant level of reaction force acting on the belt to level F2 (see FIG. 3). As the bushing 100 is further compressed the reactive force will level out at a force level of F2 approximately 2675–4460 Newtons (600 to 1,000 pounds) until the bushing is completely and plastically deformed.

After the nut 90 has traversed through its range of motion or the bushing becomes fully deformed the retractor can no longer sustain the constant reactive force level F2. Thereafter the relationship between web extraction and reactive force generated on the seat belt is defined by the elasticity of the safety belt (see S3 of FIG. 3).

Figure 5:
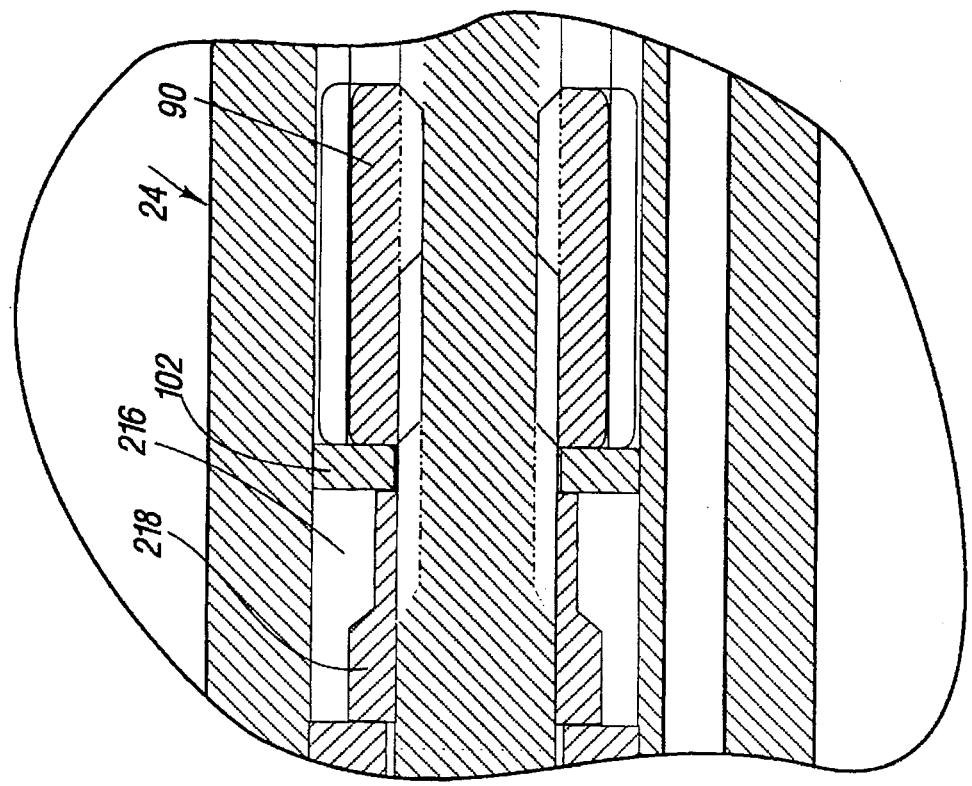
FIG. 5 is a partial view of another alternative embodiment of the invention.
Figure 4:
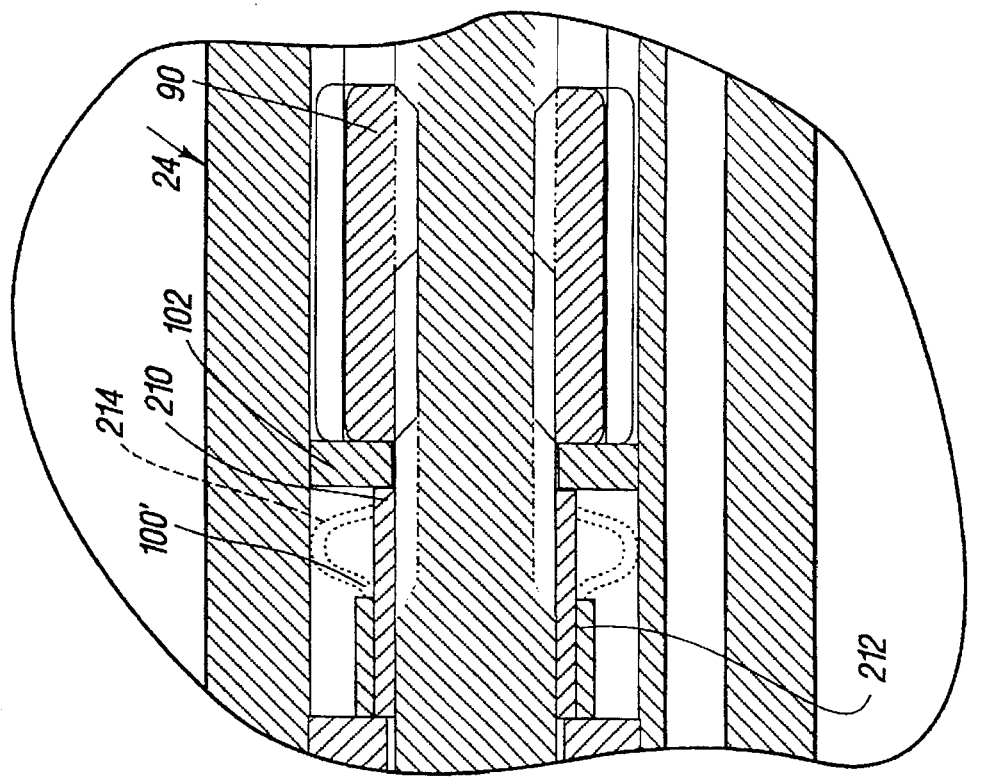
FIG. 4 is a partial view of another embodiment of the invention.

Reference is briefly made to FIG. 4 which shows an alternative retractor configuration to provide secondary impact protection. The bushing 100' includes a first thin portion and a thickened portion that may be constructed in a number of ways. As an example, a long first bushing portion 210 may be received within and extend out from a shorter second bushing portion 212. The first bushing portion may be of the same material as the bushing 100 illustrated in FIG. 1 so that when it is compressed by the nut 90 it will develop a generally constant reactive force level F1 as described above. Subsequent motion of the nut into the bushing 100' deforms the bushing portion 210 into a washer-like shape as shown by phantom line 214. Further motion of the nut is now reacted against by both the inner part of the first bushing portion 210 and the second or outer bushing portion 212 providing for an increased second level of reactive force F2. The bushing 100 may be fabricated using two parts having the same or dissimilar materials, of a one-part machined 216 construction (see FIG. 5) having a thicker wall segment comprising the combined thickness of parts 210 and 212. Alternately, the bushing parts 210 and 212 may be formed of dissimilar materials to be able to more selectively control the reactive force generated during the second impact. As an example, brass, copper or aluminum can be used for bushing 210.

Figure 7:
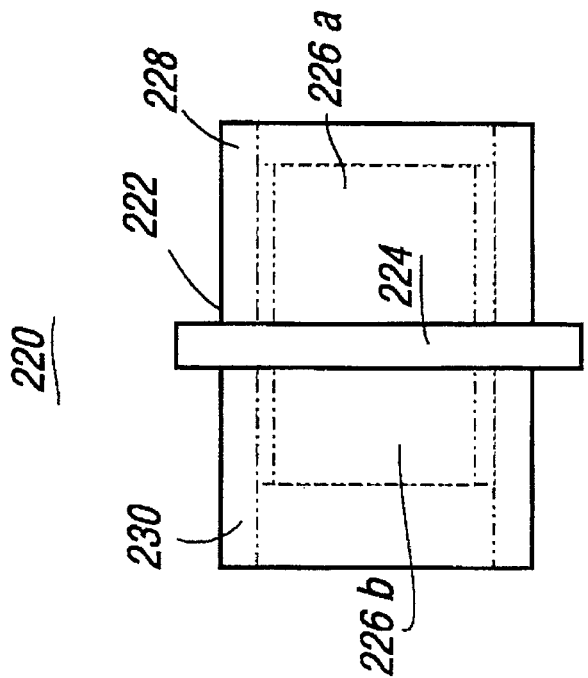
FIGS. 6 and 7 show an additional embodiment of the invention.
Figure 6:
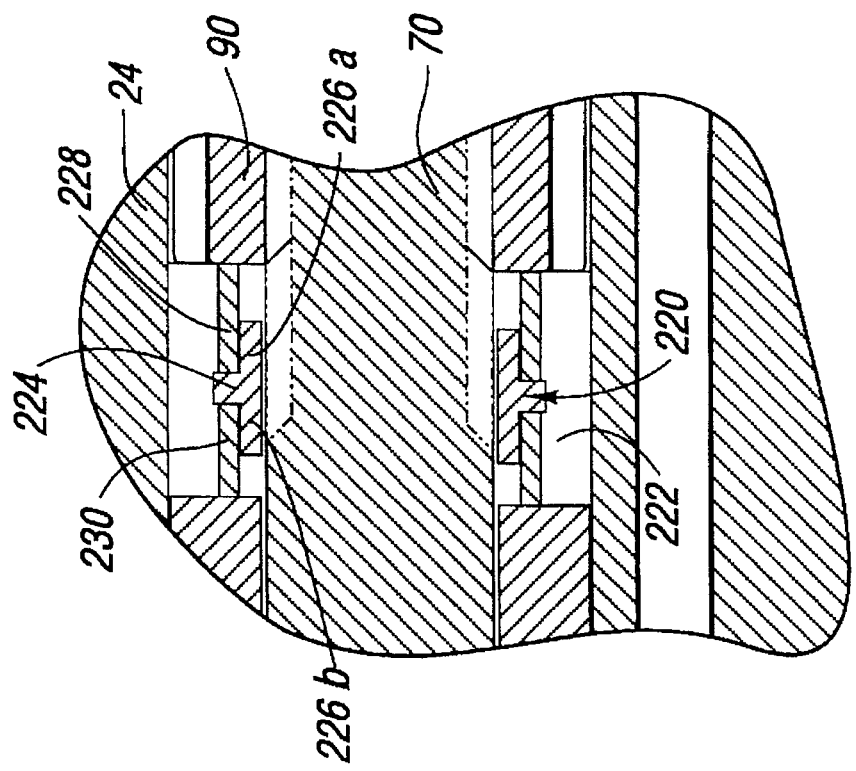

Reference is made to FIGS. 6 and 7 which show another bushing 220 comprising a tubular carrier 222 having an annular center member 224 and tubular extensions 226a and b. Fitted about tube 226a is a first bushing portion 228 and fitted about tube 226b is another bushing portion 230. The yield strength of bushing portions 230 is less than that of bushing portion 226b. As the nut 90 moves to the left the bushing 220 is compressed. Movement of the bushing 220 will first cause bushing portion 228 to yield generating a constant reaction force F1. Continued movement of the nut 90 against the bushing 220 during the second impact will then compress bushing portion 230 which upon yielding will generate a greater reaction force F2.

Many changes and modifications in the above described embodiment of the invention can, of course, be carried out without departing from the scope thereof. Accordingly, that scope is intended to be limited only by the scope of the appended claims.

We claim:

1. A seat belt retractor (20) for protecting an occupant during a vehicle impact comprising:

a rotating spool or reel (24), seat belt webbing (31) wound about the spool and adapted to extend about the occupant;

first locking means (71) operatively connected to the spool for initially preventing the rotation of the spool during a first impact, first means (90, 100) associated with the spool, for enabling the spool to rotate after a predetermined load, in excess of a first level, has been applied to the webbing, and for generating a generally constant reaction force of a first level on the webbing opposing occupant motion, including a deformable bushing and a displaceable member which compresses the bushing, wherein the bushing deforms outwardly as it is compressed;

second means, active after belt forces reach the predetermined load on the seat belt webbing, for increasing the reaction force as a function of further protraction of the seat belt webbing from the spool and to generate a higher reaction force of a second level on the webbing, including wherein the spool includes a bore disposed about the bushing and wherein after a predetermined amount of motion of the displaceable member the bushing is deformed sufficiently outwardly to abut an inner wall of the bore thereby effectively increasing the stiffness of the bushing, whereupon any further outward expansion of the bushing is prohibited and further motion of the displaceable member is resisted thereby generating the reaction force at the second level.

2. The device as defined in claim 1 wherein a washer is disposed between the bushing and displaceable member.

3. A seat belt retractor (20) for protecting an occupant during a vehicle impact comprising:

a rotating spool or reel (24), seat belt webbing (31) wound about the spool and adapted to extend about the occupant;

first locking means (71) operatively connected to the spool for initially preventing the rotation of the spool during a first impact, first means (90, 100) associated with the spool, for enabling the spool to rotate after a predetermined load, in excess of a first level, has been applied to the webbing, and for generating a generally constant reaction force at a first level on the webbing opposing occupant motion, including a deformable bushing having a first thin portion which is outwardly expandable into a washer-like shape and a displaceable member which compresses the thin first bushing portion to the washer-like shape thereby generating the first level reaction force;

second means, active after belt forces reach the predetermined load on the seat belt webbing for increasing the reaction force as a function of further protraction of the seat belt webbing from the spool and to generate a higher reaction force at a second level on the webbing, including a second bushing portion, adjacent the first bushing portion and opposite the displaceable member, the second bushing portion being more resistive to the compressive motion of the displaceable member than is the first bushing portion to thereby generate the second level reaction force.

4. A seat belt retractor (20) for protecting an occupant during a vehicle impact comprising:

a rotating spool or reel (24), seat belt webbing (31) wound about the spool and adapted to extend about the occupant;

first locking means (71) operatively connected to the spool for initially preventing the rotation of the spool during a first impact, first means (90, 100) associated with the spool, for enabling the spool to rotate after a predetermined load, in excess of a first level, has been applied to the webbing, and for generating a generally constant reaction force of a first level on the webbing opposing occupant motion and thereafter for generating a reaction force of a higher second level, including an annular carrier (222) having a center member (224) and a first bushing (228) positioned adjacent one side of the center member and a second bushing (230) positioned adjacent an opposite side of the center member, wherein the yield strength of the first and second bushings are dissimilar, whereby the first level reaction force is generated as the displaceable member deforms the first bushing and the second level reaction force is generated as the second bushing is deformed.

5. The device as defined in claim 4 wherein a washer is disposed between the thin bushing portion and displaceable member.

* * * * *